United States Patent
Seymour

(10) Patent No.: US 7,601,524 B1
(45) Date of Patent: Oct. 13, 2009

(54) COMMERCIAL PRODUCTION OF SYNTHETIC FUEL FROM BIO-DIESEL BY PRODUCTS SYSTEM

(75) Inventor: Gary F. Seymour, Grand Rapids, MN (US)

(73) Assignee: Twister Energy Corporation, Grand Rapids, MN (US)

( * ) Notice: Subject to any disclaimer, the term of this patent is extended or adjusted under 35 U.S.C. 154(b) by 433 days.

(21) Appl. No.: 11/613,045

(22) Filed: Dec. 19, 2006

Related U.S. Application Data

(63) Continuation of application No. 11/464,086, filed on Aug. 11, 2006, now Pat. No. 7,238,728, and a continuation-in-part of application No. 11/556,006, filed on Nov. 2, 2006, now Pat. No. 7,244,771.

(51) Int. Cl.
*C12P 7/14* (2006.01)
*C10L 1/182* (2006.01)

(52) U.S. Cl. .......................... 435/162; 44/451

(58) Field of Classification Search .............. None
See application file for complete search history.

(56) References Cited

U.S. PATENT DOCUMENTS

| | | | |
|---|---|---|---|
| 4,452,691 A | 6/1984 | Polomski | |
| 4,743,272 A | 5/1988 | Weinberger | |
| 5,554,520 A | 9/1996 | Fowler et al. | |
| 5,763,716 A | 6/1998 | Benham et al. | |
| 5,871,980 A | 2/1999 | Nayler et al. | |
| 5,980,700 A | 11/1999 | Iritani | |
| 6,001,141 A | 12/1999 | Quigley | |
| 6,086,645 A | 7/2000 | Quigley et al. | |
| 6,302,929 B1 | 10/2001 | Gunnerman | |
| 6,371,998 B1 | 4/2002 | Mathur | |
| 6,558,442 B2 | 5/2003 | Tis et al. | |
| 6,565,617 B2 | 5/2003 | Kalghatgi | |
| 6,641,624 B1 | 11/2003 | Govoni et al. | |
| 6,689,925 B2 | 2/2004 | Malhis | |
| 6,793,695 B2 | 9/2004 | Wilkes et al. | |
| 6,818,027 B2 | 11/2004 | Murcia | |
| 6,960,673 B2 | 11/2005 | Brunner et al. | |
| 6,964,691 B1 | 11/2005 | Govoni et al. | |
| 2002/0020109 A1 | 2/2002 | Donovan et al. | |
| 2004/0049973 A1 | 3/2004 | Donovan et al. | |
| 2005/0282916 A1 | 12/2005 | Betts et al. | |

OTHER PUBLICATIONS

Lubert Stryer, Triaglycerols are Hydrolyzed by Cyclic-Amp-Regulated Lipases, Biochemistry, 1981, p. 386, Second Edition.
Albert L. Lehninger, The Molecular Basis of Cell Structure and Function, Biochemistry, 1975, p. 438, Second Edition.
Robert A. Robergs et al., Glycerol: Biochemistry, Pharmacokinetics and Clinical and Practical Applications, Sports Med, 1998, Sep. 26(3), pp. 145-167.

*Primary Examiner*—Herbert J. Lilling

(57) ABSTRACT

A commercial production of synthetic fuel from bio-diesel by products system for efficiently producing synthetic fuels and other usable by-products. The composition includes providing glycerol, providing a first fermentation tank including a glycerol kinase substance, supplying the glycerol to the first fermentation tank, producing a phosphoenolpyruvate compound within the first fermentation tank, providing a second fermentation tank including a glycerol dehydrogenase substance, supplying the phosphoenolpyruvate compound to the second fermentation tank, producing a pyruvate compound within the second fermentation tank, providing a third fermentation tank including a pyruvate decarboxylase substance, supplying the pyruvate compound to the third fermentation tank, producing an acetaldehyde compound within the third fermentation tank, providing a fourth fermentation tank including an alcohol dehydrogenase substance, supplying the acetaldehyde compound to the fourth fermentation tank, producing ethanol within the fourth fermentation tank and collecting the ethanol produced by the fourth fermentation tank.

19 Claims, 1 Drawing Sheet

COMMERCIAL PRODUCTION OF SYNTHETIC FUEL FROM BIO-DIESEL BY PRODUCTS SYSTEM

CROSS REFERENCE TO RELATED APPLICATIONS

I hereby claim benefit under Title 35, United States Code, Section 120 of U.S. patent application Ser. No. 11/464,086 filed Aug. 11, 2006 now U.S. Pat. No. 7,238,728. This application is a continuation of the 11/464,086 application. The 11/464,086 application is currently pending. The 11/464,086 application is hereby incorporated by reference into this application.

I hereby claim benefit under Title 35, United States Code, Section 120 of U.S. patent application Ser. No. 11/556,006 filed Nov. 2, 2006 now U.S. Pat. No. 7,244,771. This application is a continuation of the 11/556,006 application. The 11/556,006 application is currently pending. The 11/556,006 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to commercial fuel production and more specifically it relates to a commercial production of synthetic fuel from bio-diesel by products system for efficiently producing synthetic fuels and other usable by-products.

2. Description of the Related Art

Any discussion of the prior art throughout the specification should in no way be considered as an admission that such prior art is widely known or forms part of common general knowledge in the field.

Commercial fuel production systems have been in use for years. Typically, other systems provide synthesis for waste materials such as plants to be converted into useful gases for energy. Additionally, previous systems have provided for conversion of products such as corn or other useful items into liquid fuels. However, these previous systems did not show the conversion of what are generally considered waste products to be converted into useful products including but not limited to synthetic fuels, fertilizer, and useful gases with little or no emissions being produced from that system. Because of the general lack of efficiency and practicality in the prior art there is the need for a new and improved commercial production of synthetic fuel from bio-diesel by products efficiently producing synthetic fuels and other usable by-products.

In these respects, the commercial production of synthetic fuel from bio-diesel by products system according to the present invention substantially departs from the conventional methods of use and compositions of the prior art, and in so doing provides a composition and a method of using the composition primarily developed for the purpose of efficiently producing synthetic fuels and other usable by-products.

BRIEF SUMMARY OF THE INVENTION

In view of the foregoing disadvantages inherent in the known types of commercial fuel production now present in the prior art, the present invention provides a new commercial production of synthetic fuel from bio-diesel by products system wherein the same can be utilized for efficiently producing synthetic fuels and other usable by-products.

The general purpose of the present invention, which will be described subsequently in greater detail, is to provide a new commercial production of synthetic fuel from bio-diesel by products system that has many of the advantages of the commercial fuel production mentioned heretofore and many novel features and functions that result in a new commercial production of synthetic fuel from bio-diesel by products system which is not anticipated, rendered obvious, suggested, or even implied by any of the prior art commercial fuel production, either alone or in any combination thereof.

The invention relates to a commercial fuel production which includes providing glycerol, providing a first fermentation tank including a glycerol kinase substance, supplying the glycerol to the first fermentation tank, producing a phosphoenolpyruvate compound within the first fermentation tank, providing a second fermentation tank including a glycerol dehydrogenase substance, supplying the phosphoenolpyruvate compound to the second fermentation tank, producing a pyruvate compound within the second fermentation tank, providing a third fermentation tank including a pyruvate decarboxylase substance, supplying the pyruvate compound to the third fermentation tank, producing an acetaldehyde compound and carbon dioxide within the third fermentation tank, collecting carbon dioxide, providing a fourth fermentation tank including an alcohol dehydrogenase substance, supplying the acetaldehyde compound to the fourth fermentation tank, producing ethanol within the fourth fermentation tank and collecting the ethanol produced by the fourth fermentation tank.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a commercial production of synthetic fuel from bio-diesel by products system that will overcome the shortcomings of the prior art.

An object is to provide a commercial production of synthetic fuel from bio-diesel by products system for efficiently producing synthetic fuels and other usable by-products.

Another object is to provide a commercial production of synthetic fuel that produces little or no pollutants.

An additional object is to provide a commercial production of synthetic fuel that provides an incentive for ethanol and methanol production.

Other objects and advantages of the present invention will become obvious to the reader and it is intended that these objects and advantages are within the scope of the present invention.

3

To the accomplishment of the above and related objects, this invention may be embodied in the form illustrated in the accompanying drawings, attention being called to the fact, however, that the drawings are illustrative only, and that changes may be made in the specific use illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
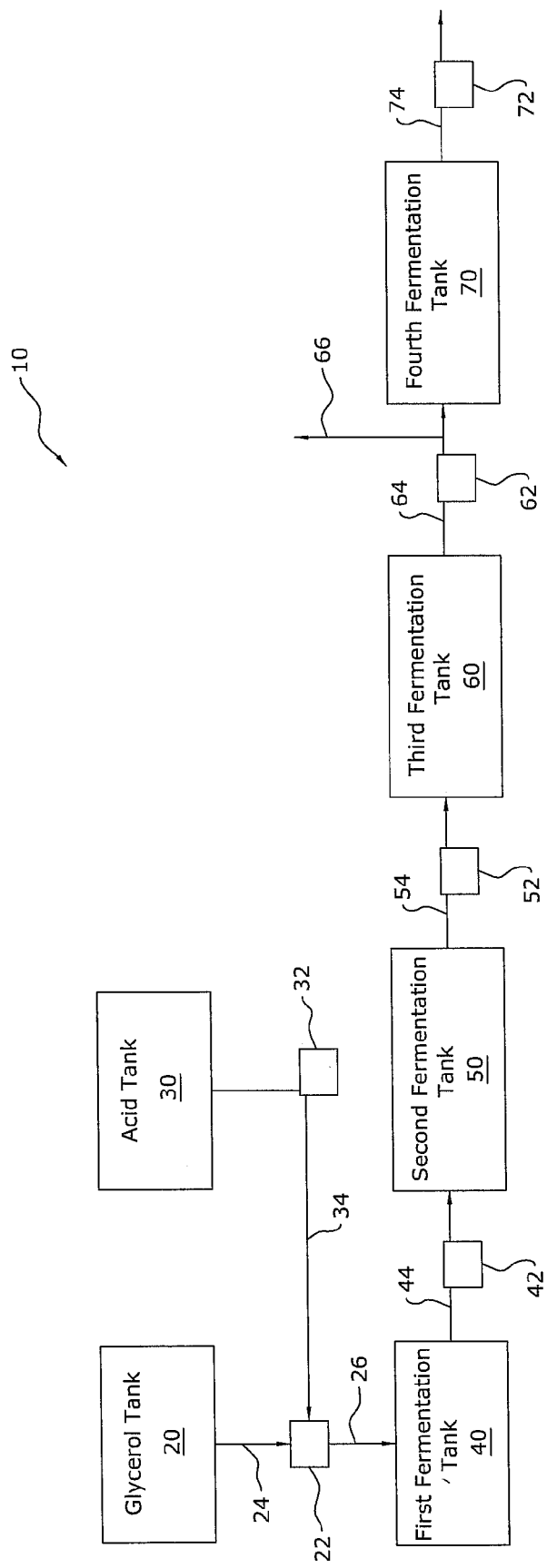
FIG. 1 is a flow diagram of the process of the present invention.

Turning now descriptively to the drawings, in which similar reference characters denote similar elements throughout the several views, FIG. 1 illustrate a commercial production of synthetic fuel from bio-diesel by products system 10 for efficiently producing synthetic fuels and other usable by-products. The composition includes providing glycerol, providing a first fermentation tank 40 including a glycerol kinase substance, supplying the glycerol to the first fermentation tank 40, producing a phosphoenolpyruvate compound within the first fermentation tank 40, providing a second fermentation tank 50 including a glycerol dehydrogenase substance, supplying the phosphoenolpyruvate compound to the second fermentation tank 50, producing a pyruvate compound within the second fermentation tank 50, providing a third fermentation tank 60 including a pyruvate decarboxylase substance, supplying the pyruvate compound to the third fermentation tank 60, producing an acetaldehyde compound within the third fermentation tank 60, collecting carbon dioxide, providing a fourth fermentation tank 70 including an alcohol dehydrogenase substance, supplying the acetaldehyde compound to the fourth fermentation tank 70, producing ethanol within the fourth fermentation tank 70 and collecting the ethanol produced by the fourth fermentation tank 70.

B. Process of Producing Ethanol from Glycerol

The glycerol utilized in the present invention may be supplied from various sources. One suitable source for the glycerol is utilizing glycerol that is a by-product from bio-diesel production. Bio-diesel is a commercially produced product that is generally produced by splitting vegetable oil (i.e. triglycerides) with alcohol and a base catalyst. Splitting vegetable oil generally forms fatty acid alcohol esters and glycerol. The glycerol is then generally passed off as a by-product, wherein bio-diesel producers do not always have a suitable use for the by-product glycerol. The present invention preferably utilizes the by-product glycerol from bio-diesel production to produce ethanol and/or methanol. Utilizing glycerol within the present invention also cuts back on the water needed to complete the fermentation processes, wherein the present invention consists of a multi-stage fermentation process.

The present invention includes a glycerol tank 20 to hold the supplied glycerol as illustrated in FIG. 1. The glycerol in the glycerol tank 20 may be adjusted to a proper pH level for use with the present invention. To adjust the glycerol to the proper pH level the glycerol from the glycerol tank 20 is preferably fed to a mixer 22 to be mixed with an acid via a non-adjusted glycerol stream 24. The mixer 22 is further preferably comprised of an in-line mixer 22 configuration. The acid is also preferably fed to the mixer 22 via an acid stream 34 from an acid tank 30. The acid is preferably comprised of a configuration to suitably adjust the glycerol to a proper pH level, wherein the pH range for glycerol in the present invention is 4-10. Further, the preferred pH level of the glycerol is 7.35±0.1. A first pump 32 also assists in supplying the acid to the mixer 22 via the acid stream 34. The first pump 32 ensures that the acid travels solely in a forward direction from the acid tank 30 to the mixer 22. The glycerol also preferably maintains a temperature range between 10-80 degrees Centigrade through the fermentation processes. Further the fermentors preferably maintain a temperature of 36.5±0.1 degrees Centigrade. It is appreciated that various heating or cooling devices may be incorporated into the present invention to maintain the temperature of the glycerol and fermentors at the preferred level.

Once the glycerol is adjusted to the preferred pH level the glycerol is fed via an adjusted glycerol stream 26 to a first fermentation tank 40. The first fermentation tank 40 is preferably comprised of a fixed-bed fermentor configuration, wherein the fixed-bed fermentor configuration assists in minimizing enzyme loss. The first fermentation tank 40 includes a glycerol kinase substance. The glycerol kinase substance is fermented with the adjusted glycerol in the first fermentation tank 40 to produce a phosphoenolpyruvate compound. The glycerol kinase substance is further preferably fermented with the adjusted glycerol via enzymatic fermentation. The phosphoenolpyruvate compound is then fed to a second fermentation tank 50 via a phosphoenolpyruvate stream 44 as illustrated in FIG. 1. A second pump 42 is preferably connected to the phosphoenolpyruvate stream 44 to ensure that the phosphoenolpyruvate stream 44 travels in a forward direction from the first fermentation tank 40 to the second fermentation tank 50.

The second fermentation tank 50 is preferably comprised of a fixed-bed fermentor configuration. The second fermentation tank 50 includes a glycerol dehydrogenase substance. The glycerol dehydrogenase substance is fermented with the phosphoenolpyruvate compound in the second fermentation tank 50 to produce a pyruvate compound. The glycerol dehydrogenase substance is further preferably fermented with the pyruvate compound via enzymatic fermentation. The pyruvate compound is then fed to a third fermentation tank 60 via a pyruvate stream 54 as illustrated in FIG. 1. A third pump 52 is preferably connected to the pyruvate stream 54 to ensure that the pyruvate stream 54 travels in a forward direction from the second fermentation tank 50 to the third fermentation tank 60.

The third fermentation tank 60 is preferably comprised of a fixed-bed fermentor configuration. The third fermentation tank 60 includes a pyruvate decarboxylase substance. The pyruvate decarboxylase substance is fermented with the pyruvate compound in the third fermentation tank 60 to produce an acetaldehyde compound and carbon dioxide. The pyruvate decarboxylase substance is further preferably fermented with the pyruvate compound via enzymatic fermentation. The acetaldehyde compound is then fed to a fourth fermentation tank 70 via an acetaldehyde stream 64 as illustrated in FIG. 1. A fourth pump 62 is preferably connected to the acetaldehyde stream 64 to ensure that the acetaldehyde stream 64 travels in a forward direction from the third fermentation tank 60 to the fourth fermentation tank 70. The carbon dioxide is preferably collected from the acetaldehyde stream 64 prior to the fourth fermentation tank 70. The carbon dioxide is collected via a carbon dioxide stream 66 as illustrated in FIG. 1. The carbon dioxide may be utilized in other systems to produce other valuable products or substances. One embodiment of utilizing the by-product carbon dioxide from the present invention is overviewed below in the alternate usage of by-product carbon dioxide and also detailed in application Ser. No. 11/556,006.

The fourth fermentation tank 70 is preferably comprised of a fixed-bed fermentor configuration. The fourth fermentation tank 70 includes an alcohol dehydrogenase substance. The alcohol dehydrogenase substance is fermented with the acetaldehyde compound in the fourth fermentation tank 70 to produce ethanol. The alcohol dehydrogenase substance is further preferably fermented with the acetaldehyde compound via enzymatic fermentation. The ethanol is then collected via an ethanol stream 74 from the fourth fermentation tank 70 and utilized in various manners common in the art of utilizing ethanol, such as but not limited to utilizing ethanol as a synthetic fuel and recycling ethanol to produce bio-diesel. A fifth pump 72 is preferably connected to the ethanol stream 74 to ensure that the ethanol travels in a forward direction away from the fourth fermentation tank 70. It is appreciated that the four stage fermentation process is comprised entirely of a liquid to liquid fermentation system and does not require any solid to liquid centrifuges or other separation equipment.

It is appreciated that the glycerol may be converted to ethanol in various manners rather than the alternative embodiment. One embodiment of producing ethanol from glycerol is overviewed below in the alternative embodiment for producing ethanol from glycerol and also detailed in patent application Ser. No. 11/464,086. The glycerol may be incorporated into patent application Ser. No. 11/464,086 and utilized with the ground oilseed fiber or any other plant fiber to produce synthetic fuel.

C. Alternative Usage for By-Product Carbon Dioxide

The composition includes providing wind and/or solar generated energy to a water electrolysis unit, providing water to the electrolysis unit, separating the water within the electrolysis unit into hydrogen gas and oxygen gas, supplying the hydrogen gas and the oxygen gas to a hydrogen turbine, separating hydrogen, heating carbon monoxide, and carbon dioxide in the hydrogen turbine and sending to the Fischer-Tropsch reactor, producing ethanol and methanol within the Fischer-Tropsch reactor and collecting the mixture of ethanol and methanol produced. The carbon dioxide within the system is a by-product from the present invention and is preferably fed from the carbon dioxide stream 66. This composition is further outlined in patent application Ser. No. 11/556,006.

D. Alternative Composition of Process of Producing Ethanol from Glycerol

The alternative composition includes providing wind or solar generated energy to a water electrolysis unit; providing water to the water electrolysis unit; separating the water within the water electrolysis unit into hydrogen gas and oxygen gas; supplying the hydrogen gas and the oxygen gas to a hydrogen turbine; providing heat from the hydrogen turbine to a syngas reactor; providing a ground fibrous plant material within mixed with the glycerol from the glycerol tank 20 to the syngas reactor; heating the ground fibrous plant material and glycerol within the syngas reactor to produce a syngas; separating hydrogen, carbon monoxide, and carbon dioxide from the syngas; inserting the hydrogen, the carbon monoxide, and the carbon dioxide into a Fischer-Tropsch reactor; producing ethanol and methanol within the Fischer-Tropsch reactor; and collecting the mixture of ethanol and methanol produced by the inserting the hydrogen, carbon monoxide, and carbon dioxide into the Fischer-Tropsch reactor. This composition is further outlined in patent application Ser. No. 11/464,086

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A commercial production of synthetic fuel from bio-diesel by products system, comprising:
   providing glycerol;
   providing a first fermentation tank including a glycerol kinase substance;
   supplying said glycerol to said first fermentation tank, wherein said glycerol is pH adjusted;
   fermenting said glycerol with said glycerol kinase substance within said first fermentation tank;
   producing a phosphoenolpyruvate compound within said first fermentation tank;
   providing a second fermentation tank including a glycerol dehydrogenase substance;
   supplying said phosphoenolpyruvate compound to said second fermentation tank;
   fermenting said phosphoenolpyruvate compound with said glycerol dehydrogenase substance within said second fermentation tank;
   producing a pyruvate compound within said second fermentation tank;
   providing a third fermentation tank including a pyruvate decarboxylase substance;
   supplying said pyruvate compound to said third fermentation tank;
   fermenting said pyruvate compound with said pyruvate decarboxylase substance within said third fermentation tank;
   producing an acetaldehyde compound within said third fermentation tank;
   providing a fourth fermentation tank including an alcohol dehydrogenase substance;
   supplying said acetaldehyde compound to said fourth fermentation tank;
   fermenting said acetaldehyde compound with said alcohol dehydrogenase substance within said fourth fermentation tank;
   producing ethanol within said fourth fermentation tank; and
   collecting said ethanol produced by said fourth fermentation tank.

2. The commercial production of synthetic fuel from bio-diesel by products system of claim 1, wherein said glycerol is mixed with an acid prior to supplying said glycerol to said first fermentation tank.

3. The commercial production of synthetic fuel from bio-diesel by products system of claim 1, wherein said glycerol has a pH range of 4-10.

4. The commercial production of synthetic fuel from biodiesel by products system of claim 3, wherein said glycerol has a pH level of 7.35±0.1.

5. The commercial production of synthetic fuel from biodiesel by products system of claim 1, wherein said first fermentation tank, said second fermentation tank, said third fermentation tank and said fourth fermentation tank maintain a temperature range of 10-80 degrees Centigrade.

6. The commercial production of synthetic fuel from biodiesel by products system of claim 5, wherein said first fermentation tank, said second fermentation tank, said third fermentation tank and said fourth fermentation tank maintain a temperature of 36.5±0.1 degrees Centigrade.

7. The commercial production of synthetic fuel from biodiesel by products system of claim 1, wherein carbon dioxide is produced within said third fermentation tank.

8. The commercial production of synthetic fuel from biodiesel by products system of claim 7, wherein said carbon dioxide is collected prior to said fourth fermentation tank.

9. The commercial production of synthetic fuel from biodiesel by products system of claim 7, wherein said carbon dioxide is not supplied to said fourth fermentation tank.

10. The commercial production of synthetic fuel from biodiesel by products system of claim 1, wherein said first fermentation tank, said second fermentation tank, said third fermentation tank and said fourth fermentation tank are comprised of a fixed bed fermentor configuration.

11. The commercial production of synthetic fuel from biodiesel by products system of claim 1, wherein said fermenting steps are comprised of an enzymatic fermentation process.

12. The commercial production of synthetic fuel from biodiesel by products system of claim 1, wherein said fermenting steps are comprised of a liquid to liquid fermentation process.

13. The commercial production of synthetic fuel from biodiesel by products system of claim 1, including a plurality of pumps to ensure said process travels in a forward direction from said providing said glycerol to said collecting said ethanol.

14. A commercial production of synthetic fuel from biodiesel by products system, comprising:
    providing glycerol;
    providing an acid substance;
    providing a mixer;
    mixing said glycerol with said acid substance, wherein said glycerol has a pH range of 4-10 after mixing said glycerol with said acid substance;
    providing a first fermentation tank including a glycerol kinase substance, wherein said first fermentation tank is comprised of a fixed bed fermentor configuration;
    maintaining a temperature range of 10-80 degrees Centigrade within said first fermentation tank;
    supplying said mixed glycerol and said acid substance to said first fermentation tank;
    fermenting said mixed glycerol and said acid substance with said glycerol kinase substance within said first fermentation tank;
    producing a phosphoenolpyruvate compound within said first fermentation tank;
    providing a second fermentation tank including a glycerol dehydrogenase substance, wherein said second fermentation tank is comprised of said fixed bed fermentor configuration;
    maintaining said temperature range of 10-80 degrees Centigrade within said second fermentation tank;
    supplying said phosphoenolpyruvate compound to said second fermentation tank;
    fermenting said phosphoenolpyruvate compound with said glycerol dehydrogenase substance within said second fermentation tank;
    producing a pyruvate compound within said second fermentation tank;
    providing a third fermentation tank including a pyruvate decarboxylase substance, wherein said third fermentation tank is comprised of said fixed bed fermentor configuration;
    maintaining said temperature range of 10-80 degrees Centigrade within said third fermentation tank;
    supplying said pyruvate compound to said third fermentation tank;
    fermenting said pyruvate compound with said pyruvate decarboxylase substance within said third fermentation tank;
    producing an acetaldehyde compound within said third fermentation tank;
    producing carbon dioxide within said third fermentation tank;
    providing a fourth fermentation tank including an alcohol dehydrogenase substance, wherein said fourth fermentation tank is comprised of said fixed bed fermentor configuration;
    maintaining said temperature range of 10-80 degrees Centigrade within said fourth fermentation tank;
    collecting said carbon dioxide prior to said fourth fermentation tank;
    supplying said acetaldehyde compound to said fourth fermentation tank;
    fermenting said acetaldehyde compound with said alcohol dehydrogenase substance within said fourth fermentation tank;
    producing ethanol within said fourth fermentation tank; and
    collecting said ethanol produced by said fourth fermentation tank.

15. The commercial production of synthetic fuel from biodiesel by products system of claim 14, wherein said glycerol has a pH level of 7.35±0.1.

16. The commercial production of synthetic fuel from biodiesel by products system of claim 14, wherein said first fermentation tank, said second fermentation tank, said third fermentation tank and said fourth fermentation tank maintain a temperature of 36.5±0.1 degrees Centigrade.

17. The commercial production of synthetic fuel from biodiesel by products system of claim 14, wherein said fermenting steps are comprised of an enzymatic fermentation process.

18. The commercial production of synthetic fuel from biodiesel by products system of claim 14, wherein said fermenting steps are comprised of a liquid to liquid fermentation process.

19. The commercial production of synthetic fuel from biodiesel by products system of claim 14, including a plurality of pumps to ensure said process travels in a forward direction from said providing said glycerol to said collecting said ethanol.

* * * * *